(12) United States Patent
Cai

(10) Patent No.: US 6,529,326 B2
(45) Date of Patent: Mar. 4, 2003

(54) TUNABLE OPTICAL FILTER

(75) Inventor: Bo Cai, Herts (GB)

(73) Assignee: JDS Uniphase Corporation (GB)

( * ) Notice: Subject to any disclaimer, the term of this patent is extended or adjusted under 35 U.S.C. 154(b) by 39 days.

(21) Appl. No.: 09/879,033

(22) Filed: Jun. 13, 2001

(65) Prior Publication Data

US 2002/0196541 A1 Dec. 26, 2002

(51) Int. Cl.$^7$ ............................................. G02B 27/28
(52) U.S. Cl. ........................ 359/498; 359/494; 359/497; 359/578; 359/900
(58) Field of Search ............................... 359/497, 498, 359/499, 337, 494, 577, 578, 900

(56) References Cited

U.S. PATENT DOCUMENTS

| | | | |
|---|---|---|---|
| 4,566,761 A | | 1/1986 | Carlsen et al. |
| 4,678,287 A | * | 7/1987 | Buhrer ........................ 359/497 |
| 4,685,773 A | | 8/1987 | Carlsen et al. |
| 5,528,393 A | * | 6/1996 | Sharp et al. ................. 349/117 |
| 5,812,710 A | | 9/1998 | Sugaya ........................... 385/27 |
| 5,867,291 A | | 2/1999 | Wu et al. ..................... 359/124 |
| 5,880,874 A | * | 3/1999 | Shibuya et al. ............. 359/134 |
| 5,912,748 A | | 6/1999 | Wu et al. ..................... 359/117 |
| 6,034,812 A | * | 3/2000 | Naito .......................... 359/124 |
| 6,339,492 B1 | * | 1/2002 | Terahara et al. ............. 359/280 |
| 6,384,956 B1 | * | 5/2002 | Shieh .......................... 359/497 |
| 2001/0003658 A1 | * | 6/2001 | Kim ............................ 359/488 |

FOREIGN PATENT DOCUMENTS

JP        06-276154    *   9/1994

OTHER PUBLICATIONS

E. O. Ammann "Synthesis of Optical Birefringent Networks", Progress in Optics IX, Amsterdam, North–Holland Pub. Co., New York Interscience Publishers, 1971, pp. 123–177.*

S.E. Harris, et al., "Optical Network Synthesis Using Birefringent Crystals. * I. Synthesis of Lossless Networks of Equal–Length Crystals", J. Optical Soc. America, vol. 54, No. 10, pp 1267–1278, Oct. 1964.*

* cited by examiner

Primary Examiner—John Juba, Jr.
(74) Attorney, Agent, or Firm—Hall, Priddy, Myers & Vande Sande

(57) ABSTRACT

The invention provides an optical filter having first wave retarding element for receiving an optical signal including a plurality of wavelengths, said first wave retarding element having a first periodic output response of a first phase versus wavelength for the optical signal. The optical signal is polarized when being launched into the first wave retarding element. A second wave retarding element receives the optical signal from the first wave retarding element. The second wave retarding element has a second periodic output response of a second phase versus wavelength for the optical signal. The first periodic output response and the second periodic output response are different from each other and non-integer multiples of each other. Advantageously, the gain flattening filter is tunable, cost effective, and compact in size. It is capable of producing any desired spectral curve without PDL by simply adjusting the angle of each wave retarding means. PMD and broadening is eliminated by orthogonal two-stage configuration.

14 Claims, 9 Drawing Sheets

TUNABLE OPTICAL FILTER

FIELD OF THE INVENTION

The present invention relates to the field of optical filters.

BACKGROUND OF THE INVENTION

One of the main applications of optical filters is their use as gain flattening filters in optical amplifiers. These amplifiers do not amplify all wavelength equally because they have a wavelength-dependent gain. As a result, some wavelengths are more amplified than others which means that the weaker signals may get lost in the noise. A gain equalizing filter can compensate for this difference by restoring all wavelengths to approximately the same intensity.

An erbium doped fiber amplifier (EDFA), for example, is one of the key devices for supporting WDM systems. The gain spectrum of an EDFA has asymmetrical twin peaks and a non-flat output response resulting in a power deviation between amplified signals. Furthermore, in long haul optical transmission systems, optical signals are transmitted by multi-amplifier systems, so distortions of the signal after multiple passes through optical amplifiers do occur. As a result, optical signals with a low signal to noise ratio are increasingly deteriorated in a WDM system. Thus, the transmission distance becomes shorter and the wavelength range of transmittance and the number of signal channels decrease. In order to obtain an adequate signal to noise ratio at each wavelength, it is necessary to flatten the gain of the amplifier in the range of the signals. One of the methods to flatten the gain of an amplifier is using an optical gain flattening filter. This method flattens the gain by using a filter with a reverse loss spectrum against the gain spectrum of the amplifier. It is normally desirable to maintain a flat spectral response within each channel in the system so that different wavelengths undergo similar gain or attenuation when passing through various stages of a communication system.

Conventional gain flattening filter technologies include thin film filters, short period fiber Bragg gratings, and fused fiber couplers. However, more recent trends in the design of gain flattening filters move towards customer tunable and variable gain equalizers. One example of a tunable gain flattening filter is an etalon-type gain flattening filter consisting of several etalon filters with different amplitudes and phases to compensate asymmetric amplifier gain-wavelength characteristics for flattening gain shapes. A fine control of thickness and reflectance of each etalon filter is needed to obtain each amplitude and phase of etalon filters. However, etalon-type gain flattening filters are rather expensive and not compact in size.

A variety of spectrum equalizing (or flattening) techniques have been developed to address such problems. For example, in U.S. Pat. Nos. 5,532,870 and 5,640,269, Shigematsu et al. disclose an optical fiber amplifier which reduces the wavelength dependency of gain in various wavelength ranges in wavelength division multiplexing transmission by using at least two kinds of optical fibers serially coupled, each having a glass composition selected from at least two kinds of rare-earth-doped glass compositions. Another example is the optical amplifier disclosed by Minelly and Laming in U.S. Pat. No. 5,526,175, which amplifies signals of different wavelengths throughout a spectral window while equalizing the output levels of the signals, by using a dichroic reflector at one end of an amplifying fiber to set up standing wave patterns therein by interference of the forward and reflected signal lights, at the different wavelengths.

Furthermore, daSilva et al. disclose in U.S. Pat. No. 5,345,332 a technique for channel-by-channel power regulation in a multiwavelength lightwave communications system by using a cascade of inhomogeneously broadened saturated fiber amplifiers spaced along the optical fiber transmission path.

The above disclosed techniques, however, are either too complex or more applicable to band-limited optical communication systems and may, therefore, present expensive solutions for systems transmitting a relatively large number of multiplexed channels. Such a problem is of a particular concern in optical communication systems where the selection of equalizing filters is more limited than in traditional radio communication systems. There is, therefore, clearly an important need for more economical solutions for equalizing wavelength-division multiplexed channels, especially in the case of lightwave communications, as well as a need for tunable gain flattening filters.

Furthermore, the above described applications are limited to gain equalization. There is a need for optical filters having an output response with a complex shape to yield a predetermined output response with asymmetric characteristics, i.e. other than square or sinusoidal output responses.

Carlsen discloses a birefringent optical multiplexer having a flattened bandpass in U.S. Pat. No. 4,685,773, incorporated herein by reference. Carlsen's multiplexer system utilizes birefringent optical filtering in combination with a polarization insensitivity feature and the ability to tune the passband. However, the ability to tune this multiplexer system is restricted to integer multiples of the output responses of the individual birefringent optical filtering elements.

It is an object of this invention to provide an improved tunable optical filter.

Another object of this invention is to provide an tunable optical filter that is compact in size and cost effective.

It is a further object of the invention to provide an optical filter which is tunable to fit a plurality of gain spectra.

A further object of the invention is to provide an optical filter having an output response with a complex shape.

SUMMARY OF THE INVENTION

In accordance with the invention there is provided an optical filter comprising a first wave retarding means for receiving an optical signal including a plurality of wavelengths, said first wave retarding means having a first periodic output response of a first phase versus wavelength for the optical signal, said optical signal being polarized when being launched into the first wave retarding means; and a second wave retarding means for receiving the optical signal from the first wave retarding means and having a second periodic output response of a second phase versus wavelength for the optical signal, and wherein the first periodic output response and the second periodic output response are different from each other and non-integer multiples of each other.

In accordance with another embodiment of the invention, a period of the first output response and a period of the second output response differ by at least 0.5 nm.

In accordance with a further embodiment of the invention, the optical filter further comprises a first polarizing beam splitter for providing the polarized optical signal launched into the first wave retarding means by splitting an input optical signal into two orthogonal sub-signals, and a second polarizing beam splitter for receiving the two sub-signals from the second wave retarding means and for combining the two sub-signals.

The present invention further provides an optical filter wherein the first and the second wave retarding means are independently rotatable about an optical axis of the optical filter for tuning the optical filter.

Thus, in accordance with some embodiments of the present invention a high order waveplate based optical filter is capable of producing any desired spectral curve without polarization dependent losses by simply adjusting the angle of each high order waveplate.

Polarization mode dispersion and broadening is eliminated by an orthogonal two-stage configuration of a first and a second filter assembly.

In accordance with the invention, there is further provided, an optical spectral equalization system for equalizing amplitudes within each channel of a group of multiplexed channels having different predetermined central wavelengths, said system comprising: a plurality of high order waveplates each having a periodic output response of a phase versus wavelength for a beam of light corresponding to the group of multiplexed channels, wherein the periodic output response of each of the plurality of high order waveplates is different and a non-integer multiple of the respective other output responses.

The invention further provides an optical spectral equalization wherein a sum of the periodic output responses of the plurality of high order waveplates is a non-periodic response of a phase versus wavelength having a complex shape for serving as an equalizer to the beam of light, the beam of light having a complementary complex shape such that an output of the optical spectral equalization system is substantially flat.

In accordance with another aspect of the invention, there is provided, a method of determining a number, length, material, and orientation of a number of wave retarding means in a gain equalization system for yielding a predetermined non-periodic output response for a beam of light having multiple wavelengths passing through the plurality of wave retarding means comprising the steps of: determining the predetermined non-periodic output response of a phase versus wavelength; performing a Fourier series analysis for determining a number of periodic output responses of a phase versus wavelength whose sum corresponds to the predetermined non-periodic output response; determining the number of wave retarding means from the number of periodic output responses; and determining the length, material, and orientation of each of the number of wave retarding means from each periodic output response of the number of periodic output responses.

In accordance with some embodiments of the invention, the period of the wave retarding means is varied by varying the length of the wave retarding means, and the amplitude of the wave retarding means is varied by rotating the wave retarding means about an optical axis of the gain equalization system.

In comparison to thin film coating or fiber Bragg grating methods, for example, a gain flattening filter in accordance with the present invention advantageously provides tunability by adjusting the angles of the high order waveplates. In comparison to acoustic and tilting Fabry-Perot cavity tuning methods, the advantages of the method and apparatus in accordance with the present invention include compact size, stability, and low cost. The combination of these advantages make the apparatus and method in accordance with the present invention not only ideal for low cost compact tunable filter applications but also for pre-adjusted fixed filter applications which fit a given spectral curve using standard components.

BRIEF DESCRIPTION OF THE DRAWINGS

Exemplary embodiments of the invention will now be described in conjunction with the following drawings wherein like numerals represent like elements, and wherein:

FIG. 5b shows a side view of the tunable optical filter presented in FIG. 5a;

FIG. 8b presents a graph of the difference between the target and the design spectrum versus wavelength for the gain spectra presented in FIG. 8a.

DETAILED DESCRIPTION OF THE INVENTION

Figure 1:
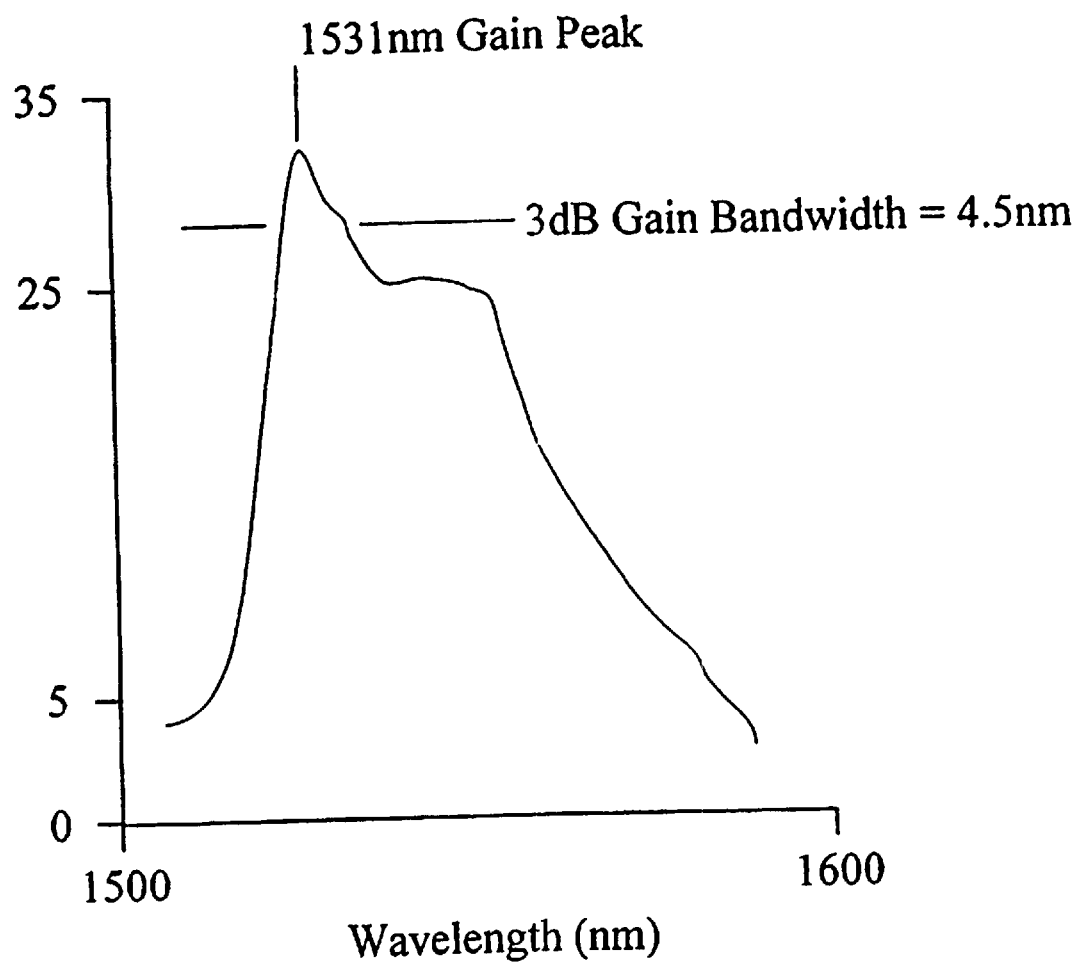
FIG. 1 presents a characteristic gain spectrum of a conventional EDFA.

Turning now to FIG. 1 a characteristic gain spectrum of a conventional EDFA is presented showing that the gain varies considerably as a function of wavelength. Notwithstanding the generally excellent characteristics of EDFAs, a disadvantage associated with EDFAs is their narrow spectral width and uneven gain band. The useful telecommunications window of an EDFA is approximately 20–30 nm wide, while an ideal amplifier would have a flat spectral gain across the full spectrum which extends from approximately 1520 nm to 1570 nm. The peak wavelength of the erbium gain spectrum varies from about 1530 nm to about 1535 nm depending upon the host glass material.

Figure 2:
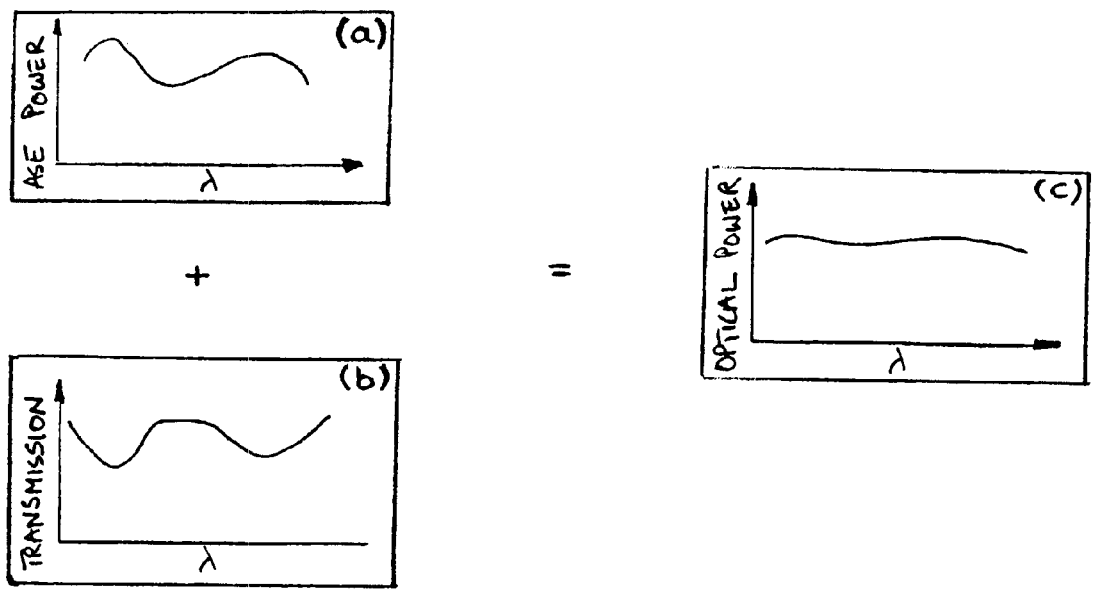
FIG. 2 shows the principles of an optical gain flattening filter.

FIG. 2 shows the principles of an optical gain flattening filter. It is seen from FIG. 2(a) that the EDFA has a gain dependence on wavelength before the gain flattening. FIG. 2(b) shows the transmission spectrum of the gain flattening filter having a reverse loss spectrum against the gain spectrum of the amplifier. FIG. 2(c) shows the gain spectrum after the gain flattening using the optical gain flattening filter and it is seen that the dependence of the EDFA on the wavelength is flattened and a deviation of signal power is improved.

Figure 3:
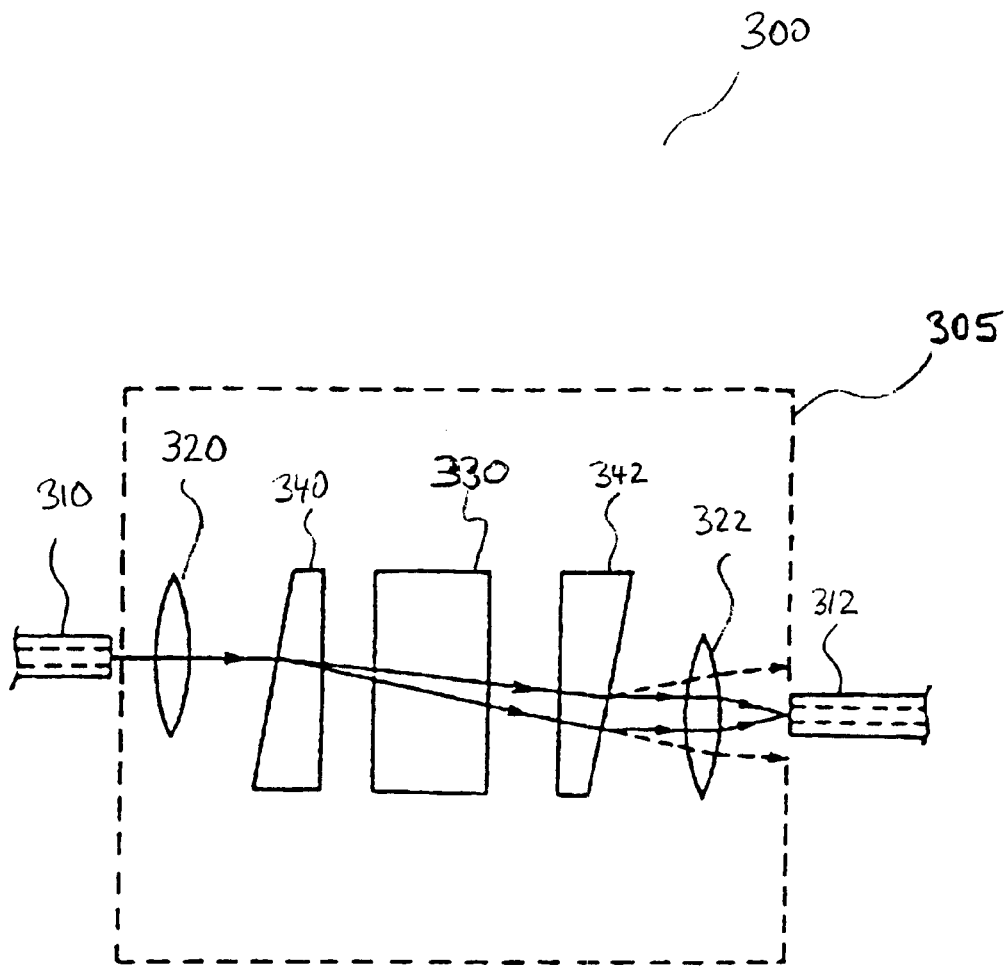
FIG. 3 shows a prior art variable optical attenuator.

Referring now to FIG. 3 a prior art variable optical attenuator 300 is shown as disclosed by Sugaya in U.S. Pat. No. 5,812,710. The optical gain balance is automatically controlled by controlling the attenuation of the variable optical attenuator as realized by a Faraday rotator based on a magneto-optic effect. This variable optical attenuator includes an input fiber 310 and an output fiber 312, and a magneto-optic crystal 305 being composed of lenses 320 and 322 and a Faraday rotator 330 between two birefringent wedges 340 and 342. To alter the optical attenuation, the coil current (drive current) is changed. When the drive current is altered, a Faraday rotation angle changes. The magneto-optic crystal 305 has a Faraday rotator 330 between two birefringent wedges 340 and 342. The quantity of light that reaches the input cross section of the output optical fiber 312 alters with the Faraday rotation angle. Therefore, the quantity of light transmitted through the magneto-optic crystal 305 is controlled by the drive current, and hence, the attenuation of the optical signal is controlled by the drive current.

In accordance with the present invention a tunable optical filter is provided so as to yield any predetermined transmission spectrum or output response by using a plurality of waveplates or high order waveplates (HOWs), such as birefringent crystals. Typical materials used for waveplates include calcite and crystalline quartz. An alternative to polishing or cleaving very thin waveplates is to use a practical thickness of waveplate material to obtain high-order waveplates. High-order waveplates have a whole number of waves plus a desired fractional retardance. The output response of such optical filters is tuned by rotating one or more of the waveplates.

A single birefringent element provides a sinusoidal bandpass. By providing a plurality of birefringent elements and orienting them at different angles, additional sinusoidal components are introduced to the transmittance transfer function. The Fourier "frequency" of each component is determined by the thickness, material, and birefringence of the birefringent elements, and the relative amplitudes of the components are determined by the relative angles of their crystal optical axes. Varying the material or length of a birefringent element causes a change in the period of the gain spectrum, i.e. the gain spectrum is stretched or compressed, and a rotation of a birefringent element causes a change in the amplitude of the gain spectrum. In accordance with the present invention a plurality of birefringent elements is provided, each having a different length, so that the output responses of the individual birefringent elements are different from each other and non-integer multiples of each other. If desired, the material of the birefringent elements can also be varied to yield different output responses.

In accordance with an embodiment of the present invention, at least two different waveplates, each having a periodic output response but different length, are used to yield an optical filter response having a complex shape and non-repeating characteristics. The output response of the filter is designed to yield a desired or predetermined overall output response to an optical signal propagating through the optical filter. Advantageously, the optical filter in accordance with the invention can yield overall output responses to optical signals that are non-symmetric or complex in shape, i.e. output responses other than square, sinusoidal, or repeating in another way. Hence, the optical filter is employed in various applications where a specific spectral amplitude of an optical signal is desired, such as gain flattening or spectral equalization.

In accordance with a further embodiment of the invention, the period of the first output response and the period of the second output response differ by at least 0.5 nm.

Figure 4A:
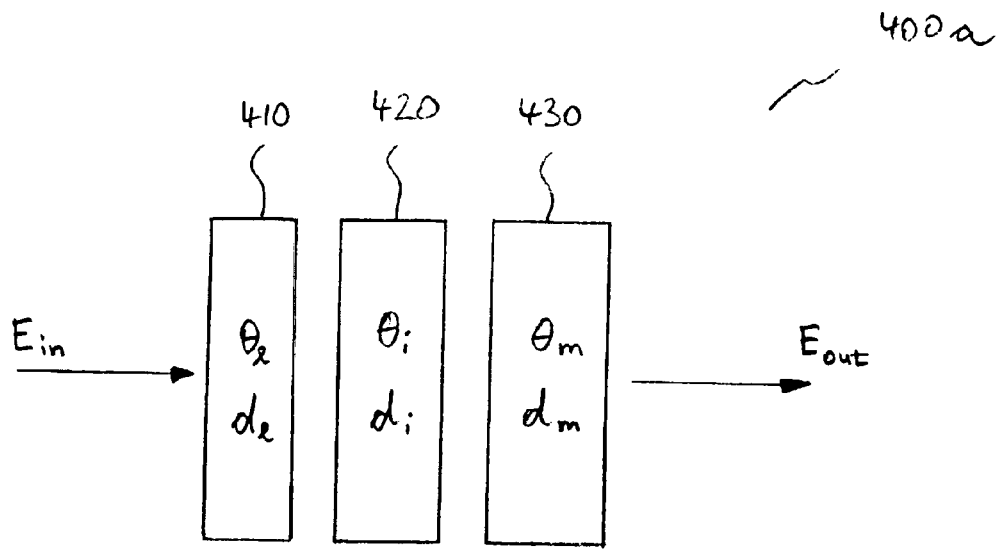
FIG. 4a shows a tunable optical filter in accordance with an embodiment of the present invention including three wave retarders.

FIG. 4a shows a tunable optical filter 400a in accordance with an embodiment of the present invention including three wave retarders 410, 420, and 430, such as waveplates or high order waveplates (HOW) made from birefringent crystals. A polarized beam of light $E_{in}$ is launched into filter 400a and propagates therethrough. The wave retarders 410, 420, and 430 have a thickness $d_l$, $d_i$, and $d_m$, respectively. A wave retarder is characterized by its retardation and its fast and slow axes. The normal modes are linearly polarized waves polarized in the directions of the axes, and the velocities are different. A relative phase shift arises between these modes upon transmission through the wave retarder. The waveplates introduce a change in a polarization state of an incoming beam of light $E_{in}$. For high order waveplates, the change in polarization state depends on an orientation of the waveplates and an optical frequency. The transmission spectrum of a polarized beam of light $E_{in}$ passing through a high order waveplate is a sinusoidal transmission spectrum with its amplitude and period determined by the orientation and the optical delay of the respective high order waveplate. Thus, the design of filter 400a is based on Fourier series expansion. Hence, when passing a polarized beam of light through a plurality of high order waveplates, the transmission spectrum is expressed as a sinusoidal series. Such a series can yield any predetermined desired spectral curve by applying Fourier series expansion theory as characterized by the Jones matrix.

Figure 4B:
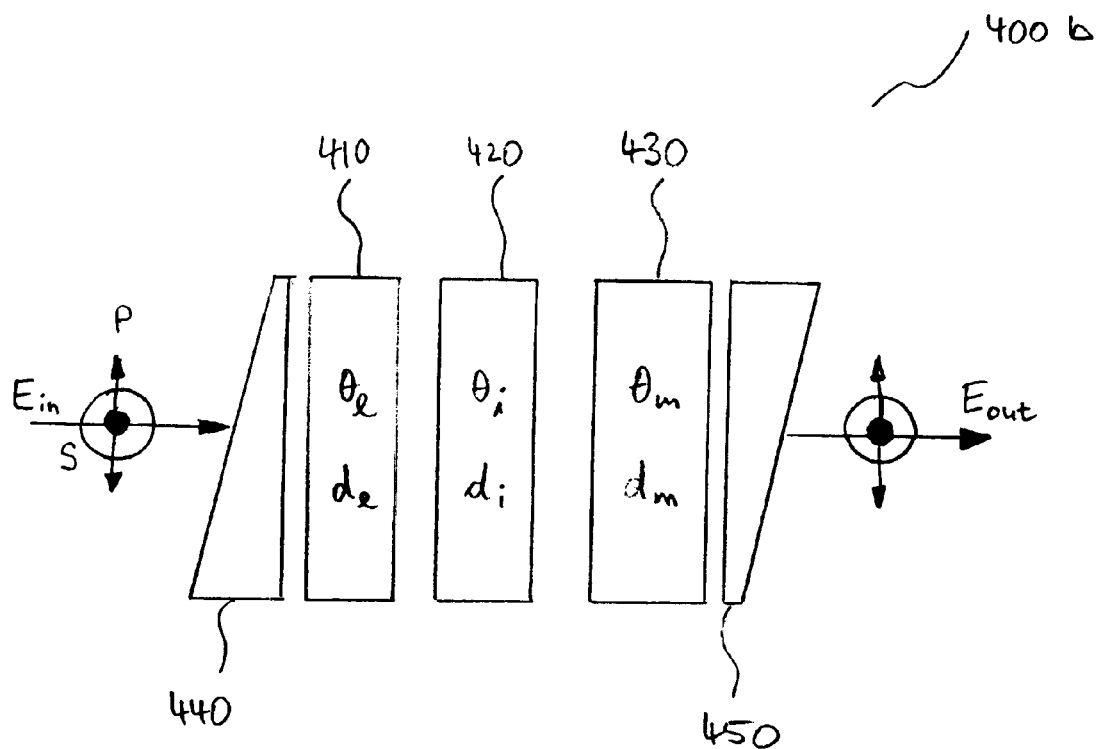
FIG. 4b shows the tunable optical filter of FIG. 4a further including two polarizing beam splitters.

FIG. 4b shows a tunable gain flattening filter 400b in accordance with another embodiment of the present invention. Gain flattening filter 400b further includes two polarizers in the form of two birefringent crystals 440 and 450 having a wedge shape. However, the invention is not intended to be limited to the wedge shape of crystals 440 and 450. Birefringent crystal 440 is disposed in front of the waveplates 410 to 430 and birefringent crystal 450 is disposed behind the waveplates 410 to 430 in a propagation direction of a light beam $E_{in}$ to $E_{out}$. As is seen from FIG. 4b the input beam of light $E_{in}$ has mixed polarization components P and S. After passing through birefringent crystal 440, the input beam $E_{in}$ is split into two sub-beams having orthogonal polarization states. After passing through the series of waveplates 410 to 430, the two sub-beams are re-combined by birefringent crystal 450 into output beam $E_{out}$. As the two sub-beams propagate through the waveplates 410 to 430, their polarization states encounter some mixing as they pass through each one of the waveplates. As a result, when combining the sub-beams with crystal 450 some losses occur. The transmission spectrum of the output beam $E_{out}$ is determined by the number of waveplates, their orientation, and their length. Alternatively, as was described above, the material of the waveplates also affects the transmission spectrum of the output beam $E_{out}$ In the following, a detailed description is presented on how a desired spectral curve is obtained in accordance with the present invention.

FIG. 4b shows gain flattening filter 400b with m (m=3) high order waveplates (HOW). A waveplate i can be characterized by the Jones Matrix as $$W_i(\theta_i, d_i, v) = R(\theta_i) A(\tau_i, v) R(-\theta_i)$$

where $\theta_i$ is the angle of the axis of the waveplate, $\tau_i$ is the optical delay of the waveplate, R is the rotation matrix, A is the waveplate matrix, and v the optical frequency. The rotation matrix R, and the waveplate matrix A are described as follows $$R(\theta) = \begin{bmatrix} \cos(\theta) & \sin(\theta) \\ -\sin(\theta) & \cos(\theta) \end{bmatrix}$$

$$A(d, v) = \begin{bmatrix} \exp(-j\pi\tau_i v) & 0 \\ 0 & \exp(j\pi\tau_i v) \end{bmatrix}$$

The matrix of the cascaded waveplates is described as $$M = \prod_{i=1}^{m} W_i = \begin{bmatrix} t & r \\ -r^* & t^* \end{bmatrix}$$

Including the polarizers, the transmitted field is expressed as $$E_t = \left\{ \begin{bmatrix} 1 & 0 \\ 0 & 0 \end{bmatrix} M \begin{bmatrix} 1 & 0 \\ 0 & 0 \end{bmatrix} + \begin{bmatrix} 0 & 0 \\ 0 & 1 \end{bmatrix} M \begin{bmatrix} 0 & 0 \\ 0 & 1 \end{bmatrix} \right\} E_{in} = \begin{bmatrix} t & 0 \\ 0 & t^* \end{bmatrix} E_{in} = \begin{bmatrix} E_{in}^P t \\ E_{in}^S t^* \end{bmatrix}$$

where t is expressed as $$t = \sum_{k=1}^{2^m} \Theta_k(\theta) e^{j2\pi\Gamma_k(\tau)v},$$

and wherein $\Theta$ and $\Gamma$ are determined by $\theta$ and $\tau$ of each HOW. The power transmission ratio for both P and S polarization components is $T=|t|^2$, indicating that there is no polarization dependent loss (PDL). By providing a predetermined number of HOWs, any desired transmission spectral curve is obtained by controlling the delay and/or the angle of each HOW.

Figure 5A:
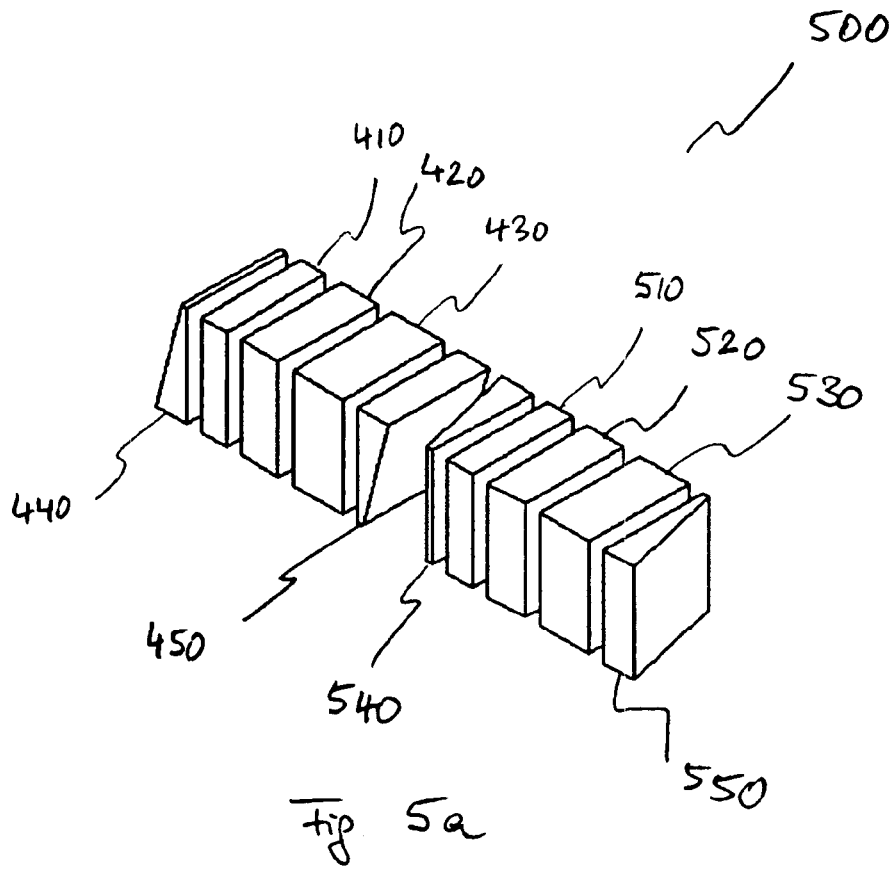
FIG. 5a shows a perspective view of a tunable optical filter in accordance with another embodiment of the present invention having an orthogonal two-stage configuration.
Figure 5B:
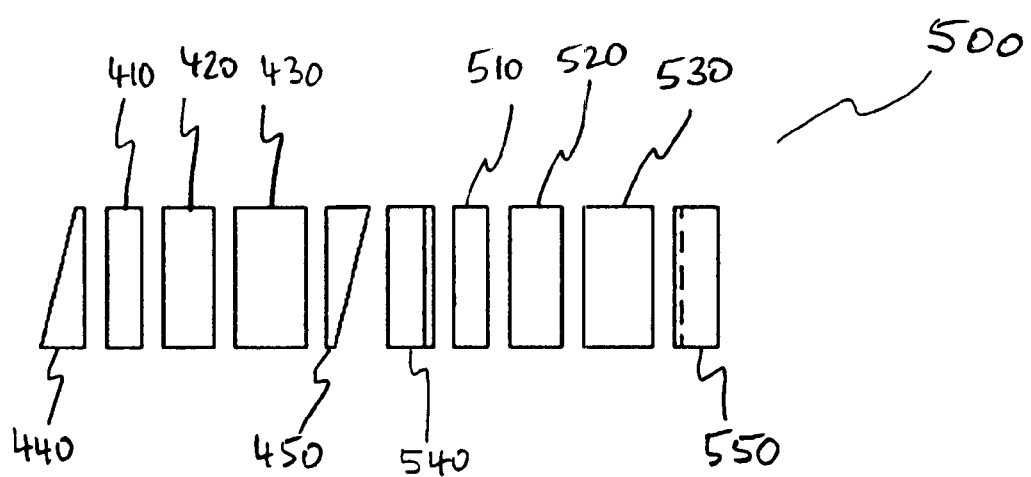
Figure 5C:
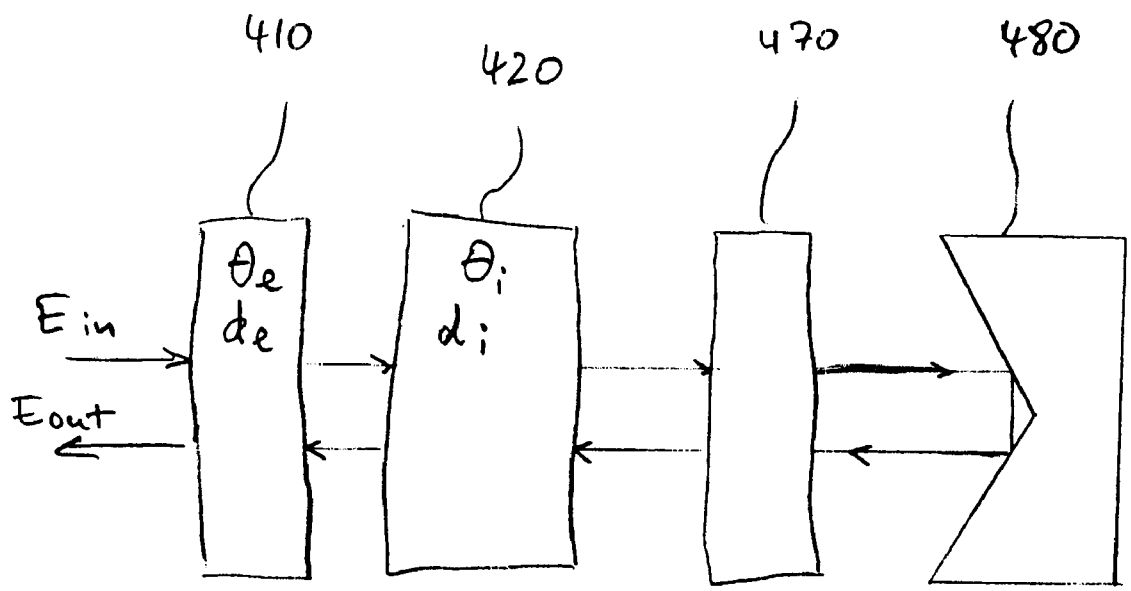
FIG. 5c shows a tunable optical filter in accordance with a further embodiment of the present invention including two wave retarders, a polarization rotator and a reflector.

However, there are two factors to be taken into consideration when designing an optical filter in accordance with the present invention. First, each input component is decomposed into $2^m$ components, each having a different delay and causing a discrete pulse broadening. Second, the P and S components are decomposed differently, both causing an equivalent polarization mode dispersion (PMD). In some applications, such a broadening and PMD is not tolerable. However, in accordance with another embodiment of the present invention, this problem is overcome by providing a second identical filter assembly and rotating it by 90 degrees about an optical axis of the gain flattening filter with respect to the first filter assembly. The optical axis of the gain flattening filter corresponds to the light path direction. This is shown in more detail in conjunction with FIGS. 5a and 5b presenting a gain flattening filter 500. FIG. 5a shows a perspective view of the tunable gain flattening filter 500 and FIG. 5b shows a side view of the tunable gain flattening filter 500. The second identical filter assembly including elements 510 to 550 is oriented perpendicular to the first filter assembly including elements 410 to 450. The second filter assembly is positioned in the path so as to receive an optical signal from the first filter assembly. The wave retarders 510, 520, and 530 of the second filter assembly have the same thickness and output response as the respective wave retarders 410, 420, and 430 of the first filter assembly.

In accordance with this embodiment of the invention, the transmitted field is expressed as follows:

$$E_t = \begin{bmatrix} t & 0 \\ 0 & t^* \end{bmatrix} R(90°) \begin{bmatrix} t & 0 \\ 0 & t^* \end{bmatrix} R(-90°) E_{in} = TE_{in}$$

Alternatively, a polarization rotator 470, such as a quarter waveplate or a Faraday rotator, and a reflector 480, such as a corner cube or right angle prism, are provided at the end of the first filter core and the light is send back through the first filter core for a second time to eliminate the effect of undesired polarization mode dispersion. The polarization rotator 470 rotates the polarization of the light by 45 degrees and the reflector 480 sends the light back to the polarization rotator 470 where it is again rotated by 45 degrees so that the light encounters a total rotation by 90 degrees before it is send back through the first filter core.

As a result, there is a low polarization dependent loss (PDL), no polarization mode dispersion (PMD), or broadening because T is always real. Thus, a HOW based gain flattening filter is capable of producing any desired spectral curve with low PDL by simply adjusting the angle of each HOW. PMD and broadening is eliminated by orthogonal two-stage configuration.

Figure 6:
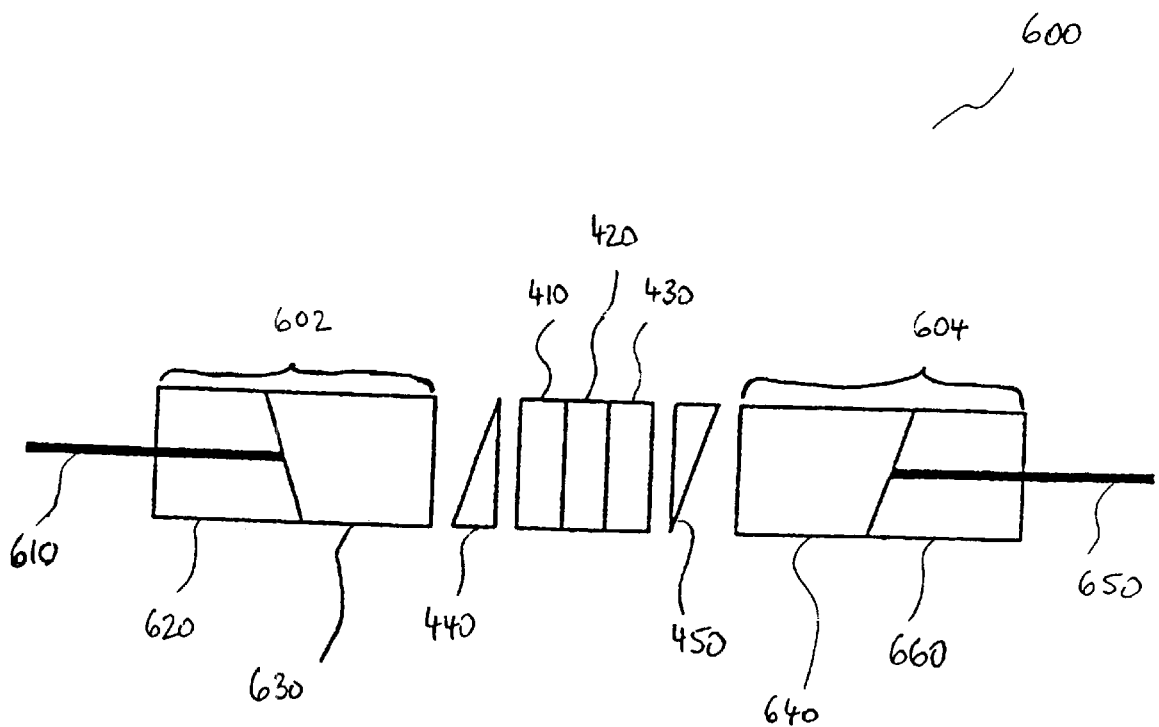
FIG. 6 shows a schematic view of another example of an optical filter in accordance with a further embodiment of the present invention including an input and an output collimator.

FIG. 6 shows a schematic view of another example of an optical filter 600 in accordance with a further embodiment of the present invention including an input collimator 602 and an output collimator 604. The input collimator 602 includes an input fiber 610 supported in a fiber sleeve 620 being coupled with a GRIN lens 630. GRIN lens 630 collimates an optical signal being launched into fiber 610. The collimated signal propagates through the birefringent wedge 440 where it is split into two sub-beams of orthogonal polarization states. The sub-beams propagate through wave retarders 410 to 430 so as to create a desired output response of filter 600 by choosing an appropriate number of wave retarders, their thickness and material, as well as their rotational orientation. Birefringent wedge 450 re-combines the sub-beams into one optical signal. The optical signal is then coupled into a GRIN lens 640 of output collimator 604. GRIN lens 640 is optically coupled with a fiber 650 supported in a sleeve 660 so as to couple the optical signal from the GRIN lens 640 into fiber 650.

Figure 7:
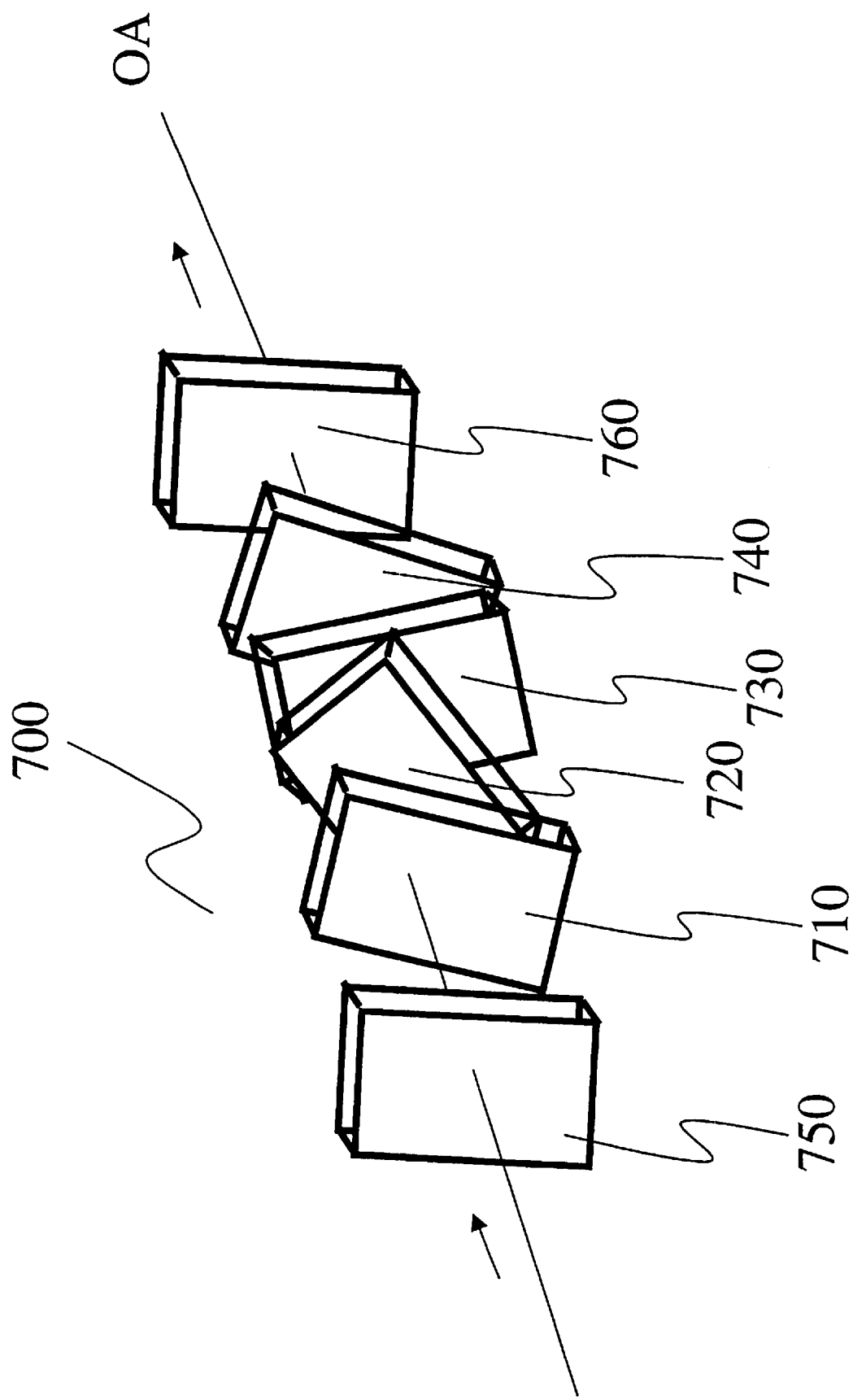
FIG. 7 shows a perspective view of a four-stage gain flattening filter in accordance with a further embodiment of the present invention.

FIG. 7 shows a perspective view of gain flattening filter 700 in accordance with a further embodiment of the present invention including four birefringent crystals 710, 720, 730, and 740 serving as high order wave plates and being disposed between a polarization beam splitter 750 and a polarization beam combiner 760 along an optical axis OA. Filter 700 is a four-stage filter as it includes 4 birefringent crystals 710 to 740 to yield a desired output response. The thickness and rotation of each birefringent crystal is determined by Fourier series expansion as described above. The perspective view of FIG. 7 shows more clearly how the birefringent crystals are rotated about the optical axis OA. The rotation of the birefringent crystals 710 to 740 provides for tunability of filter 700.

Figure 8A:
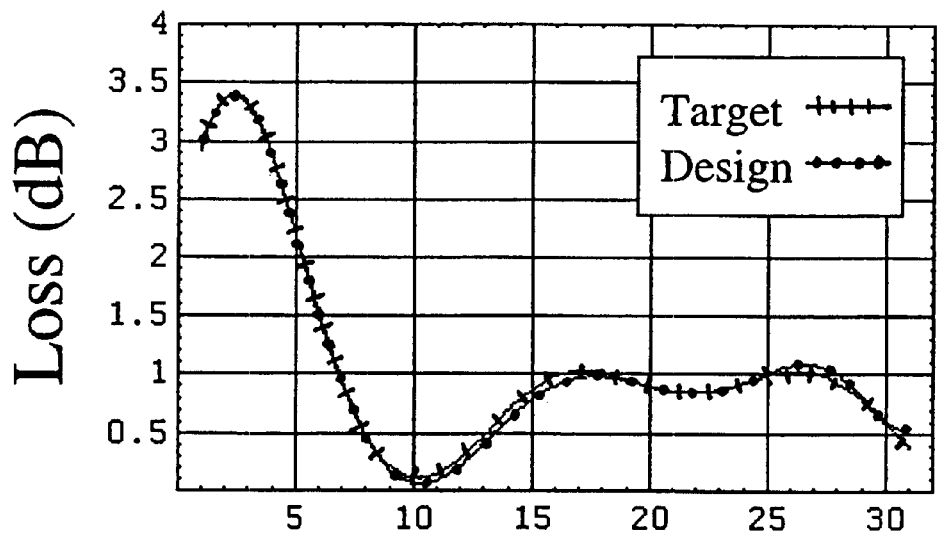
FIG. 8a presents a diagram of loss vs. wavelength for a target gain spectrum and a gain spectrum that is achieved with the design filter of FIG. 7.
Figure 8B:
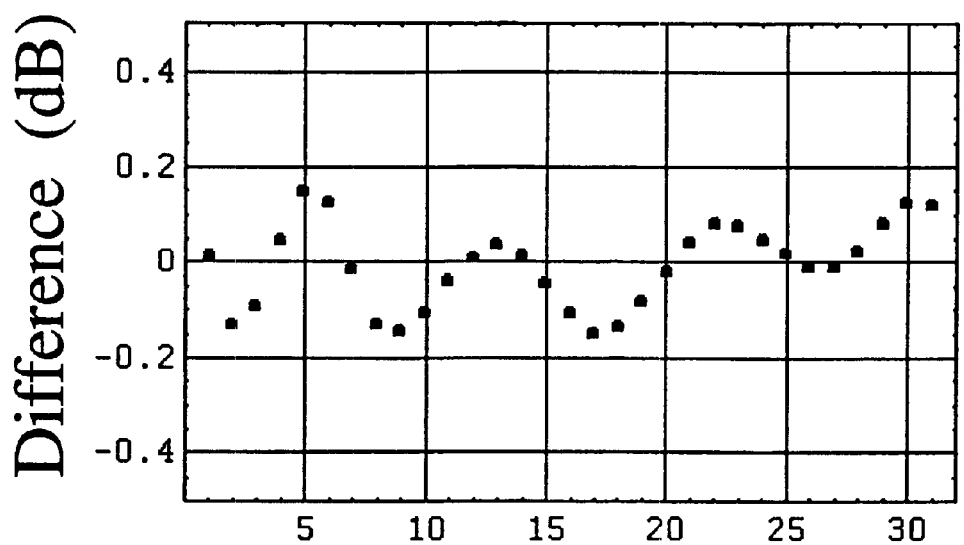

FIGS. 8a and 8b show graphs for a numerical simulation of the gain flattening filter 700 based on four high order waveplates. FIG. 8a presents a diagram of loss vs. wavelength for a desired or target gain spectrum and for a gain spectrum that is achieved with the design filter 700. As is seen from FIG. 8a, both graphs are very similar with very little deviation. FIG. 8b presents a graph of the difference between the target and the design spectrum versus wavelength to demonstrate this more clearly. The deviation between the gain spectra presented in FIG. 8a is less than +/−0.2 dB.

Customer tunable or factory pre-set gain equalizers or gain flattening filters are very practical and evident applications of the present invention. However, the capability of producing any predetermined or desired gain spectrum makes this invention applicable to wider applications, such as dense wavelength division multiplexing (DWDM). For example, a 3-port periodical square wave band splitter is ideal for realizing low loss 100 GHz DWDM with 200 GHz filters. Other examples include Code Division Multiple Access (CDMA) spectral encoders and decoders.

The above described embodiments of the invention are intended to be examples of the present invention and numerous modifications, variations, and adaptations may be made to the particular embodiments of the invention without departing from the spirit and scope of the invention, which is defined in the claims.

What is claimed is:

1. An optical filter comprising:
    a first wave retarding means for receiving an optical signal including a plurality of wavelengths, said first wave retarding means having a first periodic output response of a first phase versus wavelength for the optical signal, said optical signal being polarized when being launched into the first wave retarding means; and
    a second wave retarding means for receiving the optical signal from the first wave retarding means and having a second periodic output response of a second phase versus wavelength for the optical signal,
    wherein the first periodic output response and the second periodic output response are different from each other, and are non-integer multiples of each other,
    a period of the first output response and a period of the second output response differing by at least 0.5 nm; and,
    wherein the first and the second wave retarding means are independently rotatable about an optical axis of the optical filter for tuning the optical filter.

2. The optical filter as defined in claim 1 further comprising a first polarizing beam splitter for providing the polarized optical signal launched into the first wave retarding means by splitting an input optical signal into two orthogonal sub-signals, and a second polarizing beam splitter for receiving the two sub-signals from the second wave retarding means and for combining the two sub-signals.

3. The optical filter as defined in claim 2 wherein the first wave retarding means is a first waveplate and the second wave retarding means is a second waveplate.

4. The optical filter as defined in claim 3 wherein the first and the second waveplate are high order waveplates.

5. The optical filter as defined in claim 4 wherein the high order waveplates are birefringent crystals.

6. The optical filter as defined in claim 3 wherein the first and the second polarizing beam splitters are birefringent beam splitters.

7. The optical filter as defined in claim 6 wherein the birefringent beam splitters are wedges.

8. The optical filter as defined in claim 2 further comprising a third polarizing beam splitter for receiving the combined two sub-signals from the second polarizing beam splitter and for splitting the combined two sub-signals again into two sub-signals, a third wave retarding means for receiving the two sub-signals from the third polarizing beam splitter and having the first periodic output response, a fourth wave retarding means for receiving the two sub-signals from the third wave retarding means and having the second periodic output response, and a fourth polarizing beam splitter for receiving the two sub-signals from the fourth wave retarding means and for combining the two sub-signals, and wherein the third and the fourth polarizing beam splitter and the third and the fourth wave retarding means are being rotated by 90 degrees about an optical axis of the optical filter with respect to the first and second polarizing beam splitter and the first and second wave retarding means.

9. The optical filter as defined in claim 1 further comprising a polarization rotator for receiving the optical signal from the second wave retarding means and a reflector for receiving the optical signal from the polarization rotator and for reflecting the optical signal back to the polarization rotator such that the optical signal propagates from the polarization rotator to the second wave retarding means to the first wave retarding means.

10. An optical filter comprising:
    a first wave retarding means for receiving an optical signal including a plurality of wavelengths, said first wave retarding means having a first periodic output response of a first phase versus wavelength for the optical signal, said optical signal being polarized when being launched into the first wave retarding means; and
    a second wave retarding means for receiving the optical signal from the first wave retarding means and having a second periodic output response of a second phase versus wavelength for the optical signal,
    wherein the first periodic output response and the second periodic output response are different from each other, and are non-integer multiples of each other;
    a period of the first output response and a period of the second output response differing by at least 0.5 nm;
    further comprising a third wave retarding means for receiving the optical signal from the second wave retarding means and having the first periodic output response for the optical signal, and a fourth wave retarding means for receiving the optical signal from the third wave retarding means and having the second periodic output response for the optical signal, said third and fourth wave retarding means being rotated by 90 degrees about an optical axis of the optical filter with respect to the first and the second wave retarding means;
    wherein the first, the second, the third and the fourth wave retarding means are independently rotatable about an optical axis of the optical filter for tuning the optical filter.

11. An optical spectral equalization system for equalizing amplitudes within each channel of a group of multiplexed channels having different predetermined central wavelengths, said system comprising:
    a plurality of high order waveplates each having a periodic output response of a phase versus wavelength for a beam of light corresponding to the group of multiplexed channels,
    wherein the periodic output response of each of the plurality of high order waveplates is different and a non-integer multiple of the respective other output responses, the periodic output response of each of the plurality of high order waveplates differing by at least 0.5 nm, and
    wherein a sum of the periodic output responses of the plurality of high order waveplates is a non-periodic response of a phase versus wavelength having a complex shape for serving as an equalizer to the beam of light, the beam of light having a complementary complex shape such that an output of the optical spectral equalization system is substantially flat, and
    wherein each of the plurality of high order waveplates is rotatable about an optical axis or the optical spectral equalization system for tuning the sum of the periodic output responses.

12. The optical spectral equalization system as defined in claim 11 further including a first polarizing beam splitter disposed in front of the plurality of high order waveplates for splitting the beam of light into two sub-beams of substantially orthogonal polarization states and for providing the two sub-beams to the plurality of high order waveplates and a second polarizing beam splitter for receiving the two sub-beams from the plurality of high order waveplates and for combining the two sub-beams.

13. A method of determining a number, length, material, and orientation of a plurality of wave retarding means in an optical filter for yielding a predetermined non-periodic output response for a beam of light having multiple wavelengths passing through the plurality of wave retarding means comprising the steps of:

determining the predetermined non-periodic output response of a phase versus wavelength;

performing a Fourier series analysis for determining a number of sinusoidal periodic output responses of a phase versus wavelength whose sum corresponds to the predetermined non-periodic output response;

determining the number of wave retarding means from the number of periodic output responses; and determining the length, material, and orientation of each of the number of wave retarding means from each periodic output response of the number of periodic output responses, and varying an amplitude of at least one the sinusoidal periodic output response by rotating at least one wave retarding means about an optical axis of the gain equalization system.

14. The method as defined in claim 13 wherein a period of the wave retarding means is varied by one of varying the length of the wave retarding means, and varying the material of the wave retarding means.

* * * * *